United States Patent [19]
Lee et al.

[11] Patent Number: 6,069,671
[45] Date of Patent: May 30, 2000

[54] VIDEO PROCESSOR FOR TWO-PANEL LIQUID CRYSTAL PROJECTOR

[75] Inventors: Myeong-hwan Lee; Han-il Ko; Dong-il Song, all of Suwon, Rep. of Korea

[73] Assignee: Samsung Electronics Co., Ltd., Kyungki-do, Rep. of Korea

[21] Appl. No.: 08/972,479

[22] Filed: Nov. 18, 1997

[30] Foreign Application Priority Data

Dec. 26, 1996 [KR] Rep. of Korea ................. 96-72091

[51] Int. Cl.[7] ........................................ H04N 9/30
[52] U.S. Cl. ............................... 348/659; 348/751
[58] Field of Search .................... 348/234, 659, 348/660, 661, 739, 744, 758, 750, 751; 358/230, 231, 236, 56, 60, 30; H04N 9/30, 9/31, 9/67

[56] References Cited

U.S. PATENT DOCUMENTS 5,184,212  2/1993  Yamamoto et al. ............. 348/234

FOREIGN PATENT DOCUMENTS 408043791  2/1996  Japan .

*Primary Examiner*—David E. Harvey
*Attorney, Agent, or Firm*—Sughrue, Mion, Zinn, Macpeak & Seas, PLLC

[57] ABSTRACT

A video signal processing apparatus for use in a two-panel liquid crystal projector includes a preprocessor for receiving primary color video signals and for generating a first luminance signal having only a high frequency component and a first plurality of color signals in which the high frequency component is removed, and a matrix circuit for receiving the first luminance signal and the first plurality of color signals, and for generating a second luminance signal and a second plurality of color signals using a minimum one of the first plurality of color signals as a reference signal, wherein each of the second plurality of color signals is generated by subtracting the reference signal from a respective first color signal. The second luminance signal and the second plurality of color signals generated by the matrix circuit are used for light modulation by a luminance signal liquid crystal panel and a color signal liquid crystal panel, respectively. Thus, an unnatural image phenomenon in an image displayed with regard to the primary color video signals is removed, and resolution and brightness can be improved. Further, disharmonization between the luminance signal component and the color signal component can be prevented in view of the optical and signal processing conditions.

6 Claims, 8 Drawing Sheets

VIDEO PROCESSOR FOR TWO-PANEL LIQUID CRYSTAL PROJECTOR

BACKGROUND OF THE INVENTION

1. Field of the Invention

The present invention relates to a liquid crystal projector using a liquid crystal panel, and particularly to a video signal processing apparatus for a liquid crystal projector in which video signals applied to a liquid crystal panel are controlled so as to improve brightness and resolution of a displayed image.

2. Description of Related Art

Generally, a liquid crystal projector uses a liquid crystal panel in which light modulation is controlled according to an applied voltage to display an image on a screen. The liquid crystal projector uses a one-panel system, a two-panel system or a three-panel system.

Figure 1:
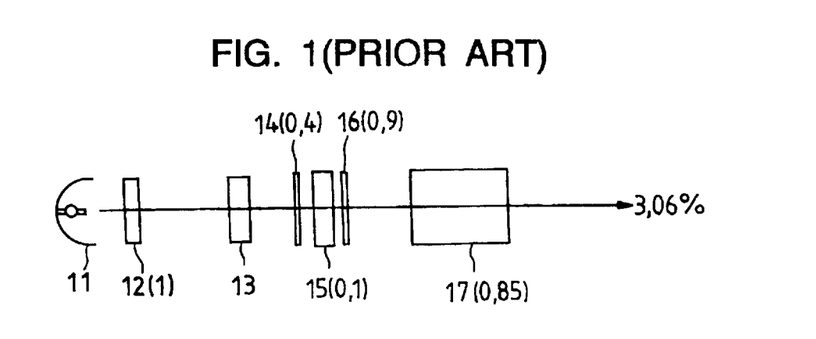
FIG. 1 is an optical arrangement diagram of a conventional one-panel liquid crystal projector.
Figure 2:
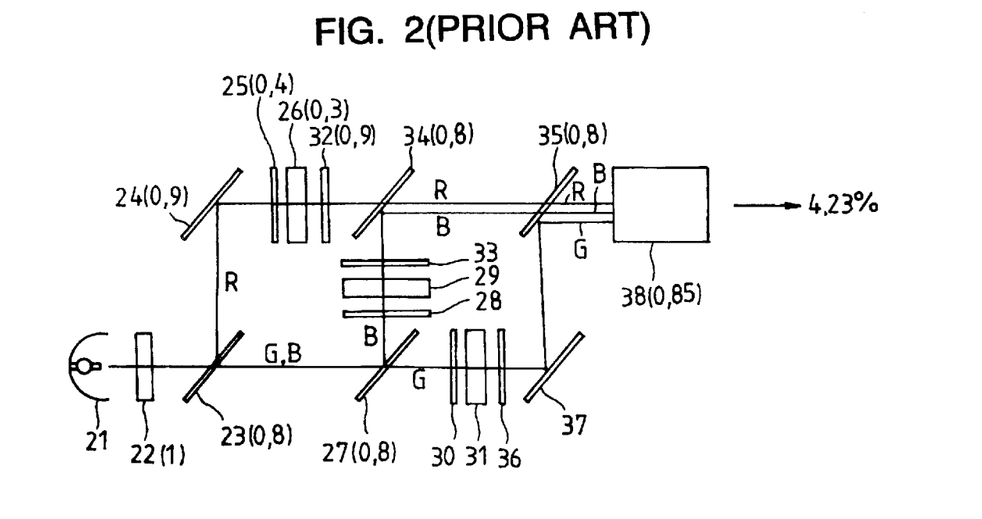
FIG. 2 is an optical arrangement diagram of a conventional three-panel liquid crystal projector.
Figure 3:
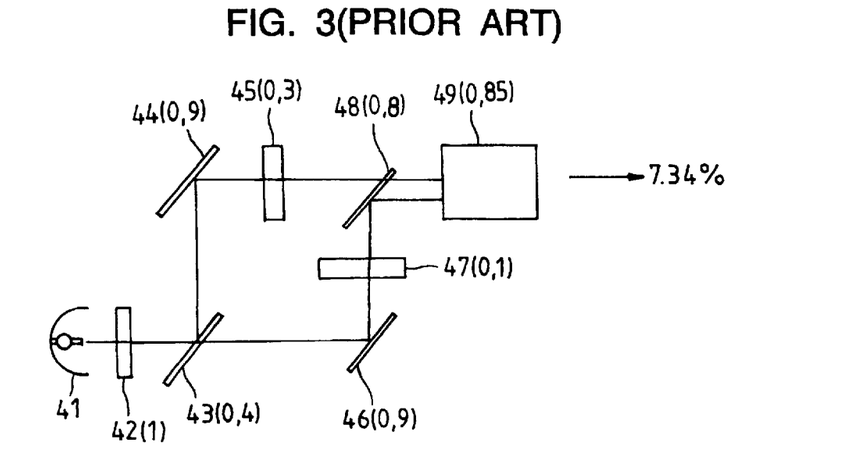
FIG. 3 is an optical arrangement diagram of a conventional two-panel liquid crystal projector.

Referring to FIGS. 1 through 3, conventional liquid crystal projectors adopting the one-panel, two-panel and three-panel systems will be described below. In FIGS. 1 through 3, values in the parentheses of the respective reference numerals represent light transmission coefficients in corresponding components. The light transmission coefficients correspond to those of commercial components which are currently available.

FIG. 1 shows a conventional one-panel liquid crystal projector. When the light from a lamp 11 passes through a hot mirror 12, light excluding a visible ray is intercepted. The visible ray is collected by a focus lens 13 and then the collected visible ray is incident to a polarizing filter 14. Only forty percents of the incident light passes through polarizing filter 14 and is incident to a liquid crystal panel 15 for R, G and B primary color signals. Only ten percents of the incident light of liquid crystal panel 15 passes therethrough and then is incident to polarizing filter 16. Ninety percent of the light incident to polarizing filter 16 passes therethrough and then is projected on a screen via a projection lens 17. As described above, since the one-panel liquid crystal projector has a small number of the components, a compact, low-price and easily assembled product may be manufactured. However, since a color signal liquid crystal panel composed of a combination of R, G and B subpixels has been used, an efficiency of light utilization is reduced to 3.06% to resulting in low image brightness.

FIG. 2 shows an optical arrangement of a conventional three-panel liquid crystal projector. The three-panel liquid crystal projector uses three liquid crystal panels for R, G and B color signals, respectively. When the light from a lamp 21 passes through a hot mirror 22, light excluding a visible ray is intercepted. The visible ray is incident to a dichroic mirror 23. The dichroic mirror 23 separates color components of the incident light. The R component reflected from dichroic mirror 23 passes through a mirror 24 and a polarizing filter 25 and is incident to a liquid crystal panel 26 for an R signal. The G and B components transmitted through dichroic mirror 23 are incident to another dichroic mirror 27. The B component reflected from dichroic mirror 27 passes through a polarizing filter 28 and is incident to a liquid crystal panel 29 for a B signal. The G component transmitted through dichroic mirror 27 passes through a polarizing filter 30 and is incident to a liquid crystal panel 31 for a G signal. The light passing through R signal liquid crystal panel 26 and the light passing through B signal liquid crystal panel 29 are incident to dichroic mirror 34 via polarizing filters 32 and 33, respectively. The dichroic mirror 34 transmits the R component of the incident light and reflects the B component thereof, to transfer the incident components to dichroic mirror 35. The light passing through G signal liquid crystal panel 31 passes through polarizing filter 36 and then is reflected from mirror 37. The light reflected from mirror 37 is incident to dichroic mirror 35. The dichroic mirror 35 for combining the colors transmits the R and B components and reflects the G component, so as to be supplied to a projection lens 38. The projection lens 38 projects the incident light on a screen. As described above, since the three-panel liquid crystal projector uses a liquid crystal panel for each color component, the picture of quality is higher and an the total efficiency of light utilization of 4.23% is higher than those of the one-panel system. Thus, the brightness of the image is slightly increased. However, due to the higher number of the components, the structure is complicated. Also, use of the three liquid crystal panels results in increased costs.

A two-panel liquid crystal projector has been developed to solve the drawbacks of the above-described one-panel and the three-panel system. A conventional two-panel liquid crystal projector is shown in FIG. 3. The two-panel liquid crystal projector uses two liquid crystal panels for a luminance signal and a color signal. In FIG. 3, when the light from lamp 41 passes through hot mirror 42, the light excluding a visible ray is intercepted. The visible ray is divided into an S polarized component and a P polarized component by polarizing filter 43. The S polarized component reflected from polarizing filter 43 is reflected again by mirror 44 and is input to a white/black liquid crystal panel 45. The P polarized component transmitted from polarizing filter 43 is reflected by mirror 46 and is input to a color liquid crystal panel 47. The S polarized component is optically modulated as a white and black image by white/black liquid crystal panel 45 and is incident to polarizing filter 48. The P polarized component is optically modulated as a color image by color liquid crystal panel 47 and is incident to polarizing filter 48. The polarizing filter 48 for combining both polarized components transmits the input white and black image and reflects the color image, so as to be supplied to a projection lens 49. The projection lens 49 supplies the white/black image and the color image to a screen, so as to be overlapped and displayed thereon.

Figure 4:
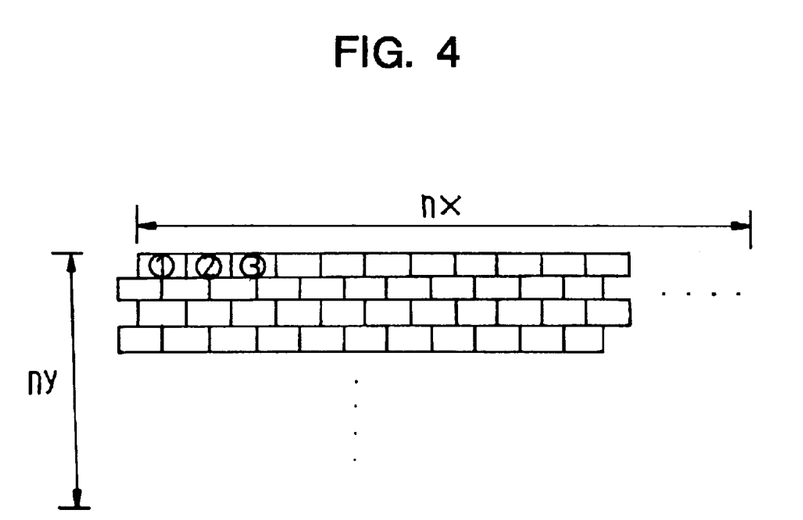
FIG. 4 shows a structure of a white/black liquid crystal panel used in the two-panel liquid crystal projector.
Figure 5:
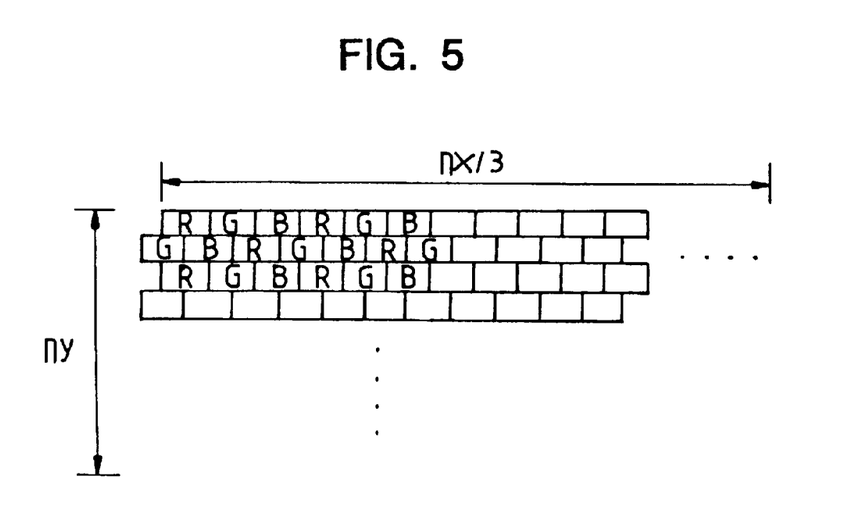
FIG. 5 shows a structure of a color liquid crystal panel used in the two-panel liquid crystal projector.
Figure 6:
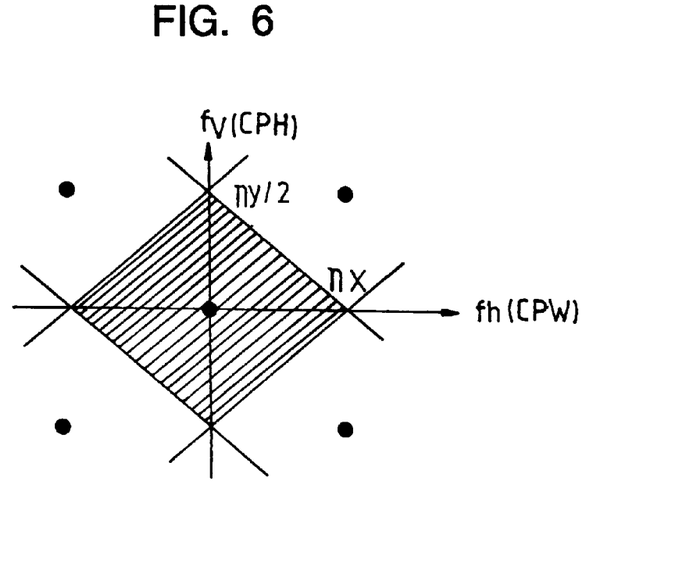
FIG. 6 shows a frequency spectrum of the white/black liquid crystal panel.

The structure of the white/black liquid crystal panel which is used in the two-panel liquid crystal projector is shown in FIG. 4 and that of the color liquid crystal panel is shown in FIG. 5. The pixel structure of the conventional liquid crystal panel has a delta-type pixel array (a triangular structure) in which an even column and an odd column are offset by half of a pixel. The pixel structure of the white/black liquid crystal panel is a field quincunx (QT) structure in space in view of a sampling operation, having a resolution area such as a frequency spectrum shown in FIG. 6. In the pixel structure of the color liquid crystal panel as shown in FIG. 5, the respective subpixels of R, G and B are offset to each other, and are arranged in a rhombic shape. Here, the subpixels of the color liquid crystal panel also have QT structures in space with respect to the respective R, G and B components. However, the horizontal resolution is decreased.

Figure 7A:
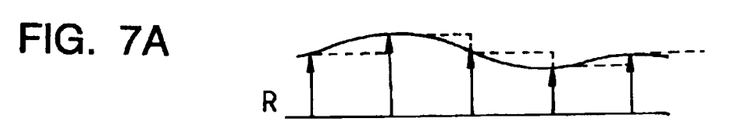
FIGS. 7A through 7D show sampling points of time with respect to the signals input to the liquid crystal panels.
Figure 7B:
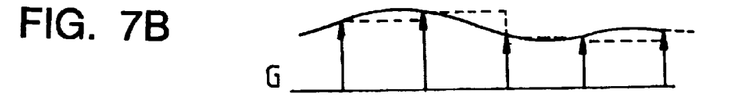
Figure 7C:
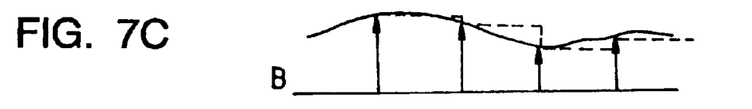
Figure 7D:
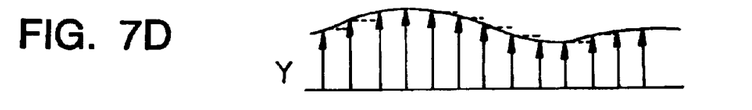

FIGS. 7A through 7D show sampling points of the signals input to the liquid crystal panels with respect to time. In case of the color liquid crystal panel, sampling of the color signals has a polyphase type in which a sampling period of one color signal R, G or B is moved by a ⅓ of a period to sample another component. Meanwhile, in the case of the white/black liquid crystal panel, sampling of the luminance signal is performed by three times the sampling frequency with respect to the color signal as shown in FIG. 7D.

Accordingly, the resolution of the image is three times greater than that of the color liquid crystal panel. Such a two-panel liquid crystal projector advantageously has a the resolution as high as the three-panel system. That is, the one-panel system uses a single liquid crystal panel in which the R, G and B components are separately displayed, with a result that the resolution is lowered. The two-panel system has the nearly same resolution as that of the three-panel system. Among the three types of the liquid crystal projector, the efficiency of light utilization is highest as 7.34% in the case of a luminance signal. Also, the two-panel liquid crystal projector is compact and relatively inexpensive.

A video signal processing circuit for use in such a two-panel liquid crystal projector is disclosed in a Japanese laid-open patent publication No. 03201695 on Sep. 3, 1991, entitled "Projection Display Apparatus." The projection display apparatus includes a white/black liquid crystal display device for modulating a light transmission factor of a first linear polarized component based on a luminance signal separated by a YC separation circuit, and a color liquid crystal display device for modulating a light transmission factor of a second linear polarized component based on the separated color signal. However, the apparatus in the prior art processes the luminance signal and the color signal so that they may be just overlapped on a screen. Thus, an unnatural image is displayed on a screen because the black level on the screen is higher than that of an original signal and the contrast is low.

SUMMARY OF THE INVENTION

Therefore, to solve the above problems, it is an object of the present invention to provide a video signal processing apparatus for use in a two-panel liquid crystal projector capable of removing a problem that an unnatural image is displayed on a screen due to low contrast, by generating a luminance signal applied to a luminance signal liquid crystal panel and color signals applied to a color signal liquid crystal panel, based on a value of a signal of color signals obtained from primary color video signals.

To accomplish the above object of the present invention, there is provided a video signal processing apparatus for use in a two-panel liquid crystal projector comprising:

a preprocessor for receiving primary color video signals and for generating a first luminance signal having only a high frequency component and a first plurality of color signals in which the high frequency component is removed;

a matrix circuit for receiving the first luminance signal and the first plurality of color signals, and for generating a second Luminance signal and a second plurality of color signals using a minimum one of the first plurality of color signals as a reference signal, wherein each of the second plurality of color signals is generated by subtracting the reference signal from a respective first color signal;

and means for receiving and processing the second luminance signal and the second plurality of color signals so as to be used by a luminance signal liquid crystal panel and a color signal liquid crystal panel, respectively.

It is another object of the present invention to provide a video signal processing apparatus for use in a two-panel liquid crystal projector capable of removing a problem that an unnatural image is displayed on a screen due to low contrast in a system capable of processing both of primary color video signals and a composite video signal.

To accomplish the other object of the present invention, there is provided a video signal processing apparatus for use in a two-panel liquid crystal projector which selectively uses one group among one groups of a luminance signal and a chroma signal and the other group of primary color video signals according to a selection control signal, the apparatus comprising:

a preprocessor for generating a first luminance signal having only a high frequency component and a first plurality of color signals in which the high frequency component is removed, using the primary color video signals received;

a luminance/chroma processor for generating a second luminance signal and a plurality of color difference signals using the luminance and chroma signals received; a matrix circuit for receiving the first luminance signal and first plurality of color signals from the preprocessor and the second luminance signal and plurality of color difference signal from the luminance/chroma processor, for generating a third luminance signal and a second plurality of color signals using a minimum one of the first plurality of color signals as a first reference signal when the first luminance signal and the first plurality of color signals are received, and for generating a fourth luminance signal and a third plurality of color signals using a minimum one of the plurality of color difference signals as a second reference signal when the second luminance signal and the plurality of color difference signals are received, wherein each of the second plurality of color signals is generated by subtracting the first reference signal from a respective first color signal, and each of the third plurality of color signals is generated by subtracting the second reference signal from a respective color difference signal; and means for receiving and processing a received group among one group of the third Luminance signal and second plurality of color signals and the other group of the fourth luminance signal and fourth plurality of color signals, so as to be used by a luminance signal liquid crystal panel and a color signal liquid crystal panel, respectively.

BRIEF DESCRIPTION OF THE DRAWINGS

The preferred embodiments are described with reference to the drawings wherein.

DETAILED DESCRIPTION OF THE PREFERRED EMBODIMENT

Preferred embodiments of the present invention will be described below in more detail with reference to the accompanying FIGS. 8 through 16.

Figure 8:
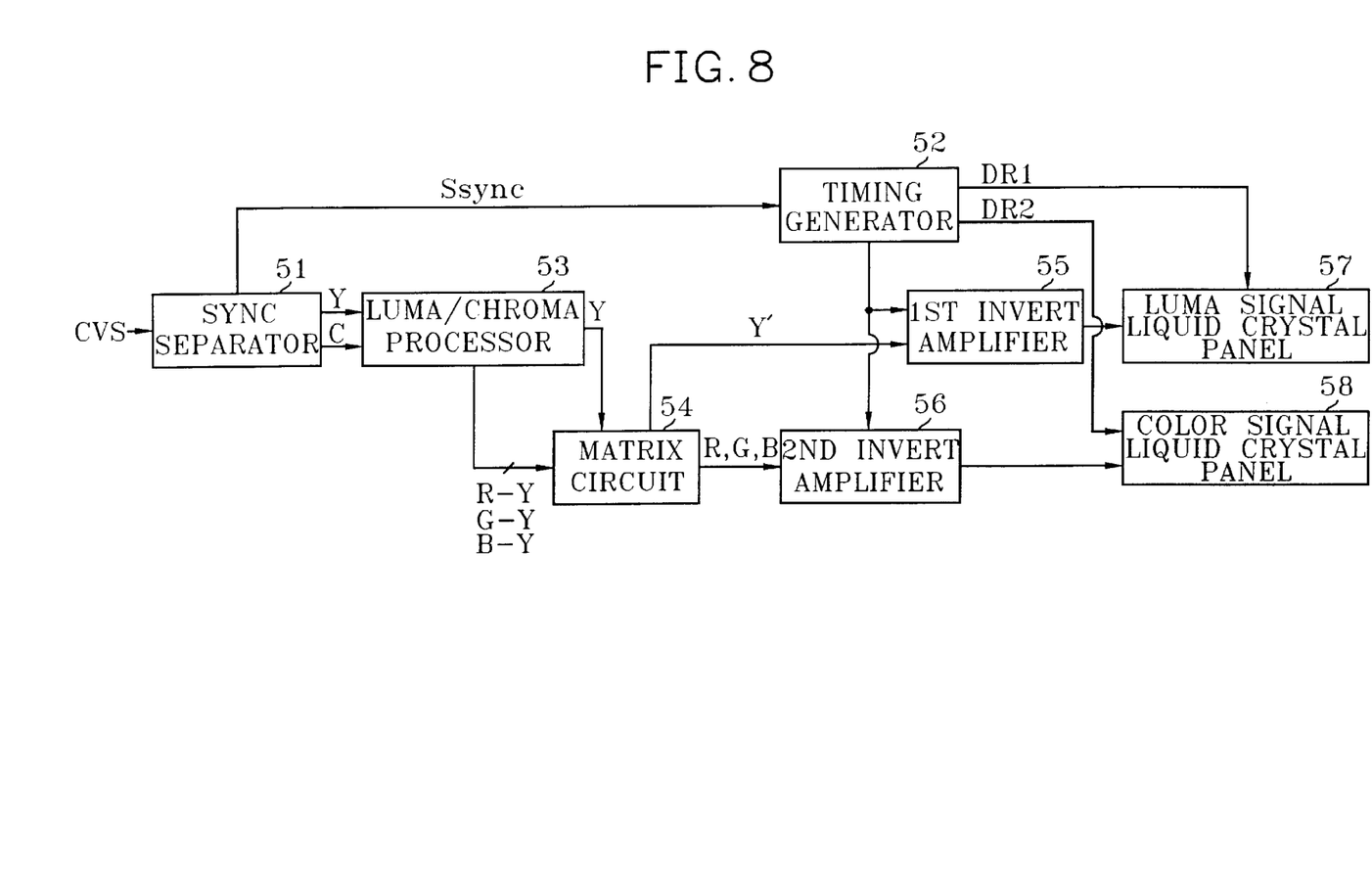
FIG. 8 is a block diagram of a signal processing system in a two-panel liquid crystal projector of the present invention.

In FIG. 8, when a composite video signal (CVS) is input to a sync separator 51, sync separator 51 separates a sync signal $S_{sync}$, a first luminance signal Y and a chroma signal C from the input signal, respectively. A timing generator 52 generates drive signals DR1 and DR2 and an invert signal synchronized to the sync signal $S_{sync}$ output from sync separator 51. The respective drive signals DR1 and DR2 are determined considering that the luminance signal has three times the sampling frequency as those of the respective color signals. Drive signal DR1 is applied to a white/black liquid crystal panel 57, while drive signal DR2 is applied to a color liquid crystal panel 56. On the other hand, a luminance/chrome processor 53 connected to the output of sync separator 51 receives first luminance signal Y and chrome signal C from sync separator 51 and generates color difference signals R-Y, G-Y and B-Y. When matrix circuit 54 has a constitutional structure shown in FIG. 9, matrix circuit 54 receives first luminance signal Y and color difference signals R-Y, G-Y and B-Y, and generates a second luminance signal Y' and color signals $R_1$, $G_1$ and $B_1$. On the other hand, when matrix circuit 54 has a constitutional structure shown in FIG. 11, matrix circuit 54 receives color signals R', G' and B' generated by an existing matrix circuit (not shown) and generates a third luminance signal $Y_2'$ and color signals $R_2$, $G_2$ and $B_2$. The luminance signal Y' is applied to a first invert amplifier 55 while color signals R, G and B are applied to a second invert amplifier 56. First invert amplifier 55 inverts and amplifies luminance signal Y' according to an invert control signal applied from timing generator 52 and supplies the result to white/black liquid crystal panel 57. Second invert amplifier 56 inverts and amplifies color signals R, G and B according to the invert control signal and supplies the result to color liquid crystal panel 58. Respective X-axis and Y-axis driver integrate circuits (not shown) in liquid crystal panels 57 and 58 operate by corresponding drive signals DR1 and DR2, respectively. Thus, white/black liquid crystal panel 57 samples the luminance signal applied from first invert amplifier 55 according to drive signal DR1, while color liquid crystal panel 58 samples the color signals applied from second invert amplifier 56 according to drive signal DR2.

Figure 9:
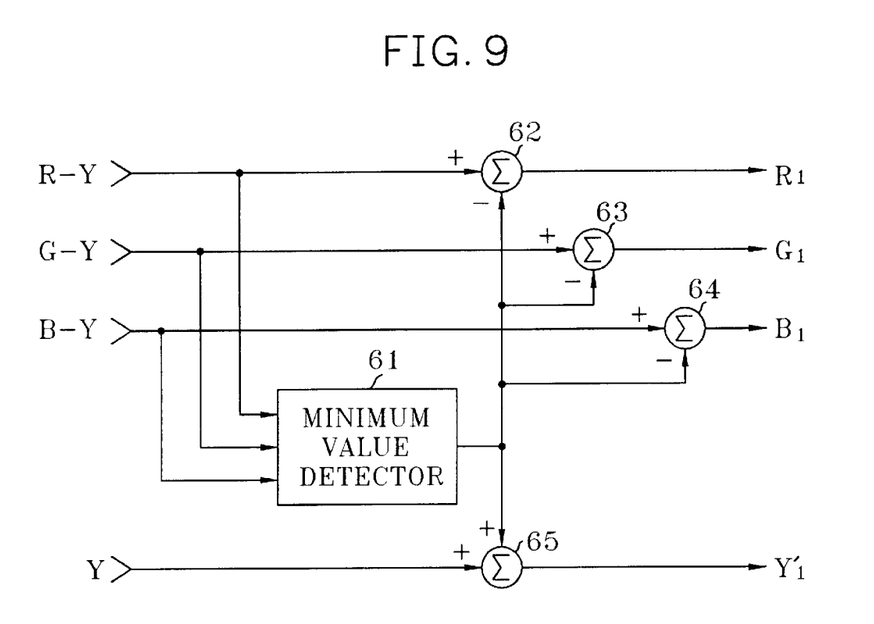
FIG. 9 is a detailed circuit diagram of the matrix circuit according to one embodiment of the present invention.

FIG. 9 is a detailed circuit diagram of the matrix circuit according to one embodiment of the present invention. The matrix circuit shown in FIG. 9 receives color difference signals R-Y, G-Y and B-Y and first luminance signal Y from luminance/chroma processor 53, and generates color signals $R_1$, $G_1$ and $B_1$ and second luminance signal $Y_1'$. Such a matrix circuit includes a minimum value detector 61, subtracters 62, 63 and 64 and an adder 65.

When color difference signals R-Y, G-Y and B-Y and first luminance signal Y from luminance/chroma processor 53 are input to the FIG. 9 circuit, minimum value detector 61 detects the minimum value among the input color difference signals and supplies the minimum value to subtracters 62, 63 and 64 and adder 65. First subtracter 62 subtracts the minimum value from color difference signal R-Y and supplies the obtained red signal $R_1$ to second invert amplifier 56 of FIG. 8. Second subtracter 63 subtracts the minimum value from color difference signal G-Y and supplies the obtained green signal $G_1$ to second invert amplifier 56 of FIG. 8. Third subtracter 64 subtracts the minimum value from color difference signal B-Y and supplies the obtained blue signal $B_1$ to second invert amplifier 56 of FIG. 8. Here, adder 65 subtracts the minimum value from first luminance signal Y and supplies the obtained second luminance signal $Y_1'$ to first invert amplifier 55 of FIG. 8. First invert amplifier 55 inverts and amplifies input second luminance signal $Y_1'$ and supplies the result to white/black liquid crystal panel 57. Second invert amplifier 56 inverts and amplifies the input color signals $R_1$, $G_1$ and $B_1$ and supplies the result to color liquid crystal panel 58.

Figure 10:
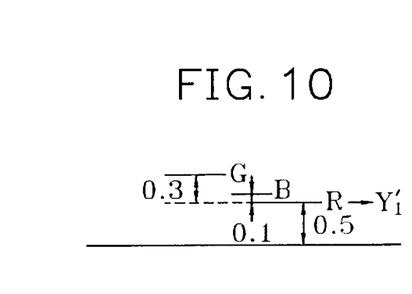
FIG. 10 is a view for explaining a change of a signal level by the matrix circuit of FIG. 9.

FIG. 10 is a view for explaining a change of a signal level by the matrix circuit of FIG. 9. For example, if the values of the respective color signals R, G and B prior to transmission are 0.5 for R, 0.8 for G and 0.6 for B, the value of luminance signal Y becomes 0.668 from a general relationship between luminance signal Y and color difference signals R-Y, G-Y and B-Y, that is, an equation of Y=0.59G+0.3R+0.11B. Thus, the value of R-Y becomes −0.188 (=0.5−0.688), the value of G-Y becomes 0.112 (0.8−0.688), and the value of B-Y becomes −0.088 (0.6−0.688). Since the minimum value of the calculated color difference signals is −0.188, minimum value detector 61 outputs the minimum value of −0.188. Thus, first subtracter 62 outputs color signal $R_1$ having the value of 0. Second subtracter 63 outputs color signal $G_1$ having the value of 0.3. Third subtracter 63 outputs color signal $B_1$ having the value of 0.1. Adder 65 outputs second luminance signal $Y_1'$ having the value of 0.5. Finally, the minimum value of 0.5 among the original color signals (R=0.5, G=0.8 and B=0.6) is supplied to first invert amplifier 55, while the difference values between the minimum value and the color signals are supplied to second invert amplifier 56.

The second embodiment of the present invention which produces signals to be supplied to invert amplifiers 55 and 56 using color signals will be described with reference to FIG. 11.

Figure 11:
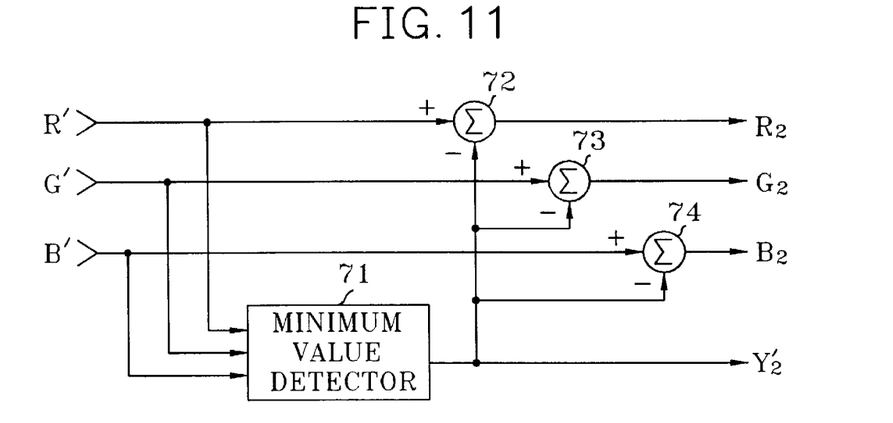
FIG. 11 is a detailed circuit diagram of the matrix circuit according to another embodiment of the present invention.

FIG. 11 is a detailed circuit diagram of part of the matrix circuit 54 according to a second embodiment of the present invention. The FIG. 9 circuit produces color signals $R_1$, $G_1$ and $B_1$ and second luminance signal $Y_1'$ to be supplied to invert amplifiers 55 and 56 using color difference signals R-Y, G-Y and B-Y and first luminance signal Y, while the FIG. 11 circuit produces color signals $R_2$, $G_2$ and $B_2$ and third luminance signal $Y_2'$ to be supplied to invert amplifiers 55 and 56 using color signals R', G' and B' which are produced by an existing matrix circuit (not shown). The conventional matrix circuit for generating color signals R', G' and B' produced by the existing method is not shown. However, according to the design selection, the conventional matrix circuit can be installed between luminance/chroma processor 53 and matrix circuit 54 of FIG. 8, or can be constituted so as to be included in matrix circuit 54. The color signals R', G' and B' produced by the conventional method are applied to minimum value detector 71 and subtracters 72, 73 and 74, respectively. The detected minimum value is used as third luminance signal $Y_2'$ which is applied to first invert amplifier 55 and is also applied to subtracters 72, 73 and 74, respectively. Fourth subtracter 72 subtracts the minimum value from the input color signal R' to generate color signal $R_2$. Fifth subtracter 73 subtracts the minimum value from the input color signal G' to generate color signal $G_2$. Sixth subtracter 74 subtracts the minimum value from the input color signal B' to generate color signal $B_2$. The signals $R_2$, $G_2$ and $B_2$ produced in subtracters 72, 73 and 74 are applied to second invert amplifier 56.

The matrix circuits which are explained referring to FIGS. 9 and 11 use the minimum value of the color difference signals or the color signals to process the luminance signal which is used for displaying the luminance component of the image. Accordingly, the resolution and brightness of the image can be enhanced. For example, when the displayed image is a single red color, the image is displayed only through color liquid crystal panel 57, while when the only luminance component of the image exists, the image is displayed through only white/black liquid crystal panel 58 having higher resolution and brightness. Then, when an image has both luminance component and chroma component, most of the luminance component is displayed through white/black liquid crystal panel 57, and a pure chroma signal component is displayed through color liquid crystal panel 58. If the R-Y component is the minimum value, there is no R component which is displayed through color liquid crystal panel 58. However, since the minimum value is substantially related to the luminance signal component, the G and B components obtained by subtracting the minimum value therefrom are displayed color liquid crystal panel 58. The luminance signal component which determines most of the resolution in the two-panel processing is displayed through white/black liquid crystal panel 57, thereby improving the overall resolution and brightness. Since the black level of the image is higher than the original signal due to the overlapping of the luminance signal and the color signals, the problem of reduced contrast can be solved. Thus, an unnatural image phenomenon can be removed so that an image close to the original image can be displayed.

However, in the general two-panel liquid crystal projector there is a considerable difference between the light utilization efficiency of an optical luminance signal path used for light modulation of a luminance signal and that of an optical color signal path used for light modulation of color signals. Referring to FIG. 3 in which the light transmission factors corresponding to the respective components are represented, the light utilization efficiency of the optical luminance signal path is approximately 7.34%, and that of the optical color signal path is approximately 2.45%. When the FIGS. 9 and 11 circuits are used in the two-panel liquid crystal projector, the luminance signal, the color difference signals or the color signals are produced by adder 65, or subtracters 62, 63 and 64 (or 72, 73 and 74) in view of the signal processing condition. The magnitudes of the newly obtained color signals become relatively smaller than the magnitude of the newly obtained luminance signal. To further improve the resolution and brightness of the image displayed by solving the above-described problems in relation to the optical condition and signal processing condition, it is necessary to control an amplification factor with respect to the luminance signal applied to first invert amplifier 55 or the color signals which are applied to second invert amplifier 56. The circuits constituted by adding a function for controlling the amplification factor to the FIGS. 9 and 11 circuits are shown in FIGS. 12 and 13.

Figure 12:
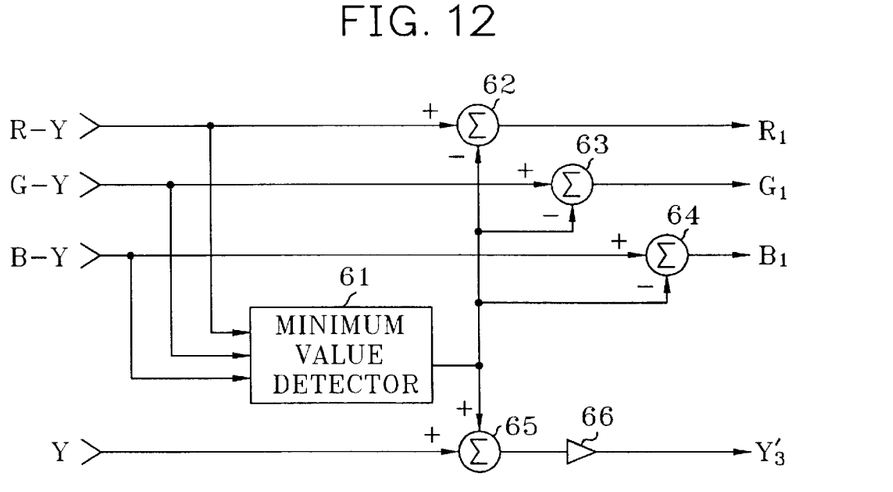
FIG. 12 shows a view of the FIG. 9 matrix circuit to which an amplifier is added.

FIG. 12 shows an amplifier 66 which is added to the output end of adder 65 in the FIG. 9 matrix circuit. FIG. 13 shows an amplifier 75 which is added to the output end of minimum value detector 71 in the FIG. 11 matrix circuit. The amplification factor of amplifier 66 or 75 which amplifies the input luminance signal and supplies the amplified result to first invert amplifier 55 is set considering the above-described signal processing and the optical conditions, and has a value for decreasing the amplitude of the luminance signal. Also, the amplification factor can be set so that the amplitude of the luminance signal is not abruptly decreased. Then, when the light utilization efficiencies of the optical luminance signal path and the optical color signal path are equal to each other and are used in consideration of the only optical conditions, an amplification factor can be set as one. If the amplification factor of amplifier 66 or 75 is set based on the above-described content or contents, The FIG. 12 amplifier 66 decreases the amplitude of third luminance signal $Y_2'$ applied from adder 65 according to a predetermined amplification factor to generate a fourth luminance signal $Y_3'$. The FIG. 13 amplifier 75 decreases the amplitude of the minimum value applied from minimum value detector 71 according to a predetermined factor to generate a fifth luminance signal $Y_4'$. The fourth luminance signal $Y_3'$ and the fifth luminance signal $Y_4'$ are applied to first invert amplifier 55, respectively.

Figure 13:
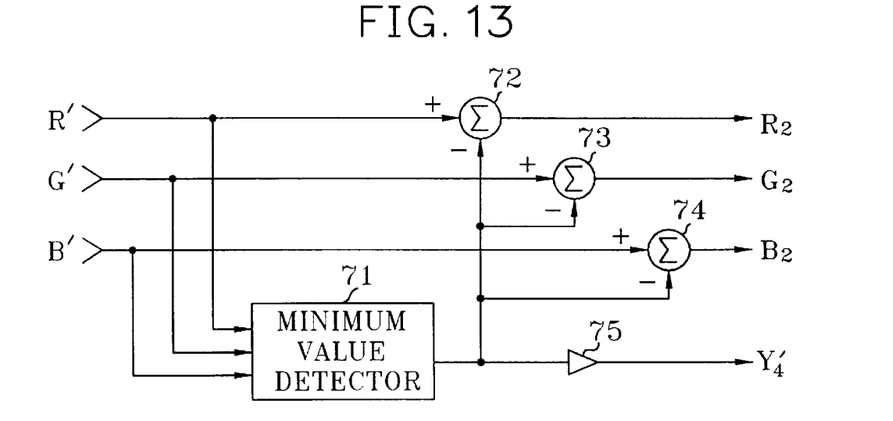
FIG. 13 shows a view of the FIG. 11 matrix circuit to which an amplifier is added.

If the FIGS. 12 and 13 circuits are adapted in the existing two-panel liquid crystal projector, the resolution and brightness can be improved. Also, the signal input to the luminance signal liquid crystal panel is attenuated in a proper ratio, to prevent disharmonization between the luminance signal component and the color signal components in consideration of the optical and signal processing conditions.

Figure 14:
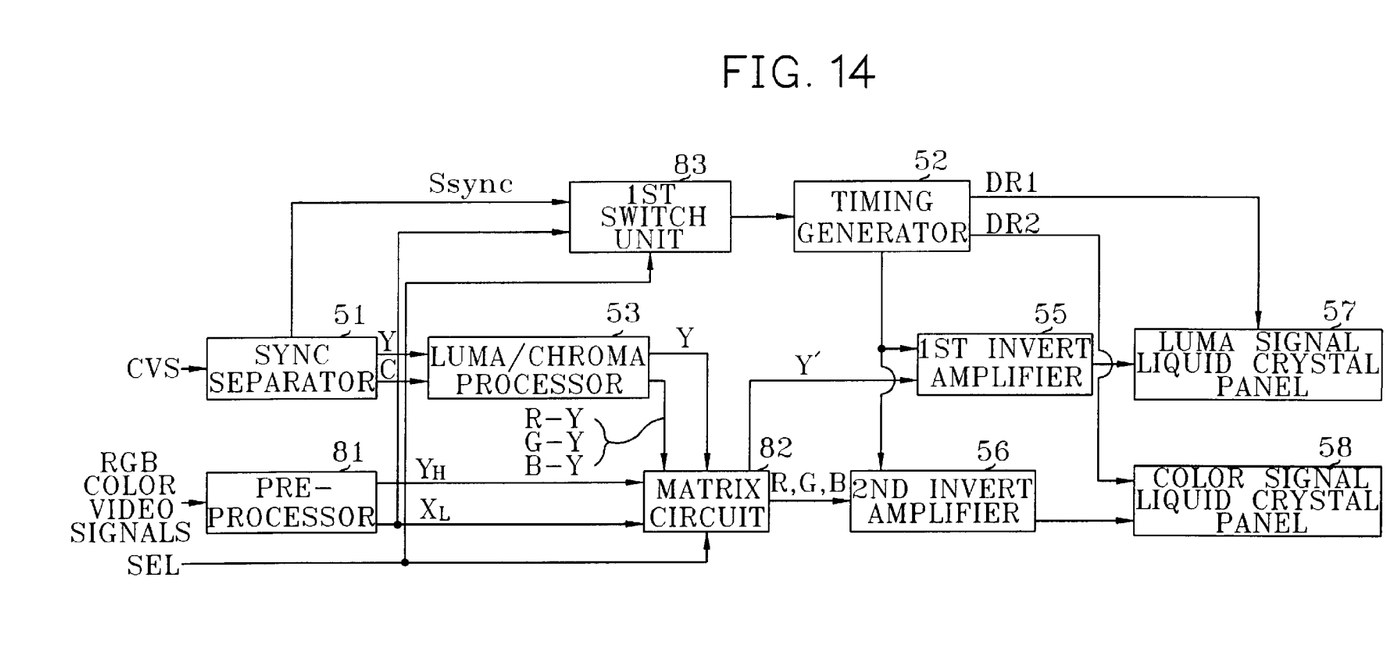
FIG. 14 is a block diagram showing a modified signal processing system.

FIG. 14 shows a modified example of the signal processing system of FIG. 8 in which primary color signals can be processed. Components of FIG. 14 having the same reference numerals as those of FIG. 8 perform the same functions as corresponding components.

In the case of using primary color video signals R, G and B, respective primary color video signals have a full band which is same as the luminance signal Y obtained from a composite video signal (CVS). Therefore, in the case of processing the primary color video signals using the above-described system of FIG. 8, color signals supplied to a color signal liquid crystal panel 58 still have the full band. Accordingly, the color signals become beyond the physical band of the color signal liquid crystal panel 58 and thus are represented as aliasing. In order to solve this problem, the system of FIG. 14 includes a preprocessor 81. In addition, the FIG. 14 system has a function capable of selectively processing a composite video signal (CVS) and the primary color video signals.

Figure 15:
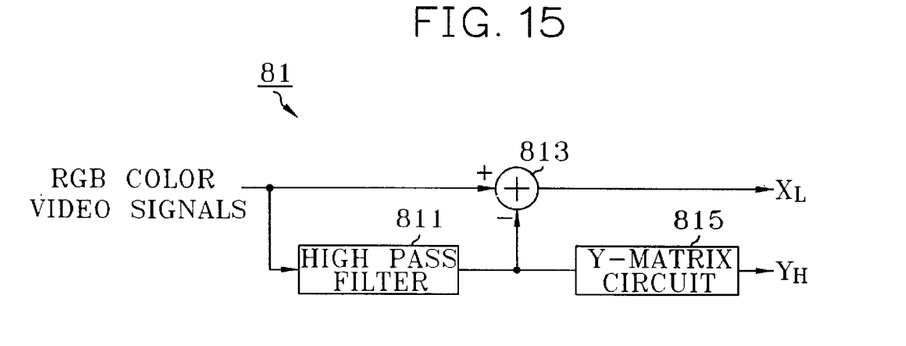
FIG. 15 is a detailed block diagram showing a preprocessor of FIG. 14.

In FIG. 14, primary color video signals, that is, RGB color video signals, are input to preprocessor 81. Then, a selection control signal SEL received from outside indicates that the RGB composite video signals are input to the system of FIG. 14. The selection control signal SEL is applied to a matrix circuit 82 and a first switch unit 83. Referring to FIG. 15 showing a constitutional structure of the preprocessor 81, the RGB color video signals are supplied to a high pass filter 811 and a subtracter 813. High pass filter 811 high-pass-filters the input RGB color video signals. The high-pass-filtered RGB color video signals are input to a subtracter 813 and an Y-matrix circuit 815. Subtracter 813 subtracts the outputs of high pass filter 811 from corresponding RGB color video signals, respectively, and outputs a set of color signals XL representing the results. The color signals XL are that high frequency components are removed, and all signals are supplied to matrix circuit 82 and one of them is applied to first switch unit 83. Y-matrix circuit 815 processes the signals output from high pass filter 811, and produces a high frequency component YH of the luminance signal to supply the produced component to a third switch unit 92.

Figure 16:
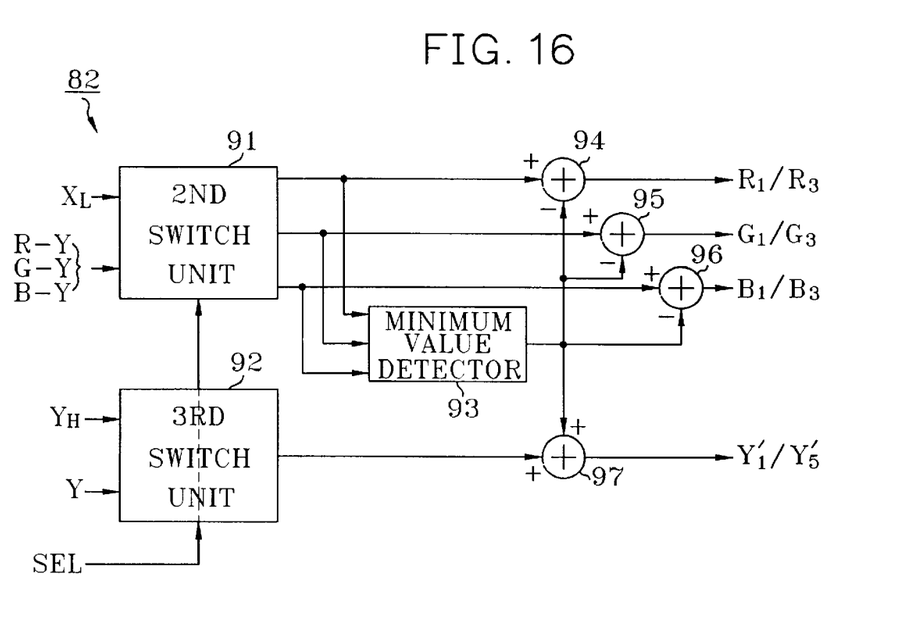
FIG. 16 is a detailed block diagram showing a matrix circuit of FIG. 14.

FIG. 16 shows a constitutional structure of matrix circuit 82 of FIG. 14. In FIG. 16, a second switch unit 91 selects one sort of a set of color signals XL and color difference signals R-Y, G-Y and B-Y according to the selection control signal SEL. Thus, in the case that RGB color video signals are input to the FIG. 14 system, second switch unit 91 selects a set of the color signals XL and outputs the selected signals. Third switch unit 92 selects a high frequency component YH of a luminance signal and outputs the selected component to an adder 97.

All the color signals XL output from second switch unit 91 are input to a minimum value detector 93. Minimum value detector 93 detects a minimum value among the input color signals XL. The detected minimum value is input to subtracters 94, 95 and 96 and an adder 97.

Subtracter 94 subtracts a minimum value supplied from minimum value detector 92 from the corresponding red signal R output from second switch unit 91 to produce a red signal R3. Subtracter 95 subtracts the minimum value from the corresponding green signal G output from second switch unit 91 to produce a green signal G3. Subtracter 96 subtracts the minimum value from the corresponding blue signal B output from second switch unit 91 to produce a blue signal B3. Adder 97 adds the high frequency component YH of the luminance signal supplied from third switch unit 92 and the corresponding minimum value output from minimum value detector 93 to generate a luminance signal Y5'. The luminance signal Y5' generated by matrix circuit 82 is applied to a first invert amplifier 55 while the color signals R3, G3 and B3 are applied to a second invert amplifier 56.

Meanwhile, first switch unit 83 supplies a received signal from preprocessor 81 according to the applied selection control signal SEL to timing generator 52. Since RGB color video signals input to preprocessor 81 contains a sync signal, the signal supplied from preprocessor 81 to timing generator 52 also holds the sync signal. Therefore, timing generator 52 can perform the same operation as when the sync signal SSYNC from a sync separator 51 is supplied.

The embodiment relating to FIG. 14 has been described with reference to the case that RGB color video signals are input. However, when a composite video signal CVS is applied, the operation of FIG. 14 is apparent to those of ordinary skilled in the art. Accordingly, more specific illustration thereof will be omitted.

Also, it is apparent to those skilled in the art that the system of FIG. 14 is modified to process only RGB color video signals. The modified system does not require circuitry for generating the luminance signal Y and the color difference signals R-Y, G-Y and B-Y to be applied to matrix circuit 82. Further, matrix circuits shown in FIGS. 9 and 11 to 13 82 can be employed instead of matrix circuit 82 shown in FIG. 16.

As described above, the video signal processing apparatus in accordance with the present invention can process primary color video signals as well as a luminance signal and color signals obtained from a composite video signal to be displayed via a liquid crystal panel for a luminance signal and color signals. Accordingly, with regard to each and every of the composite video signal and the primary color video signals, an unnatural image phenomenon is removed and resolution and brightness can be improved. Further, dis-harmonization between the luminance signal component and the color signal components can be prevented in consideration of the optical and signal processing conditions.

While the present invention has been shown and described with reference to particular embodiments thereof, it will be understood by those skilled in the art that various changes in form and details may be effected therein without departing from the spirit and scope of the invention as defined by the following claims.

What is claimed is:

1. A video signal processing apparatus for use in a two-panel liquid crystal projector comprising:

a preprocessor for receiving primary color video signals and for generating a first luminance signal having only a high frequency component and a first plurality of color signals in which said high frequency component is removed;

a matrix circuit for receiving the first luminance signal and the first plurality of color signals, for generating a second luminance signal using said first luminance signal and a minimum one of the first plurality of color signals, and for generating a second plurality of color signals using the minimum one of the first plurality of color signals as a reference signal, wherein each of said second plurality of color signals is generated by subtracting the reference signal from a respective first color signal; and means for receiving and processing the second luminance signal and the second plurality of color signals so as to be used by a luminance signal liquid crystal panel and a color signal liquid crystal panel, respectively.

2. The video signal processing apparatus according to claim 1, wherein said preprocessor comprises:

a high pass filter for high-pass-filtering the received primary color video signals;

subtracting unit for subtracting the high-pass-filtered primary color video signals output from said high pass filter from the received primary color video signals, respectively, to thereby generate the first plurality of color signals; and Y-matrix circuit for receiving and processing the high-pass-filtered primary color video signals output from said high pass filter to generate the first luminance signal.

3. The video signal processing apparatus according to claim 1, wherein the first plurality of color signals generated by said preprocessor includes a red signal, a green signal and a blue signal, and said matrix circuit comprises:

a minimum value detector for detecting a minimum value among values of the first plurality of color signals output from said preprocessor;

a first subtracter for subtracting the minimum value from the red signal output from said preprocessor;

a second subtracter for subtracting the minimum value from the green signal output from said preprocessor;

a third subtracter for subtracting the minimum value from the blue signal output from said preprocessor; and a adder for adding the first luminance signal and the minimum value to generate the second luminance signal.

4. A video signal processing apparatus for use in a two-panel liquid crystal projector which selectively uses one group among one groups of a luminance signal and a chroma signal and the other group of primary color video signals according to a selection control signal, the apparatus comprising:

a preprocessor for generating a first luminance signal having only a high frequency component and a first plurality of color signals in which the high frequency component is removed, using the primary color video signals received;

a luminance/chroma processor for generating a second luminance signal and a plurality of color difference signals using the luminance and chroma signals received;

a matrix circuit for receiving the first luminance signal and first plurality of color signals from said preprocessor and the second luminance signal and plurality of color difference signal from said luminance/chroma processor, for generating a third luminance signal and a second plurality of color signals using a minimum one of the first plurality of color signals as a first reference signal when the first luminance signal and the first plurality of color signals are received, and for generating a fourth luminance signal and a third plurality of color signals using a minimum one of the plurality of color difference signals as a second reference signal when the second luminance signal and the plurality of color difference signals are received, wherein each of said second plurality of color signals is generated by subtracting the first reference signal from a respective first color signal, and each of said third plurality of color signals is generated by subtracting the second reference signal from a respective color difference signal; and means for receiving and processing a received group among one group of the third luminance signal and second plurality of color signals and the other group of the fourth luminance signal and fourth plurality of color signals, so as to be used by a luminance signal liquid crystal panel and a color signal liquid crystal panel, respectively.

5. The video signal processing apparatus according to claim 4, wherein said preprocessor comprises:

a high pass filter for high-pass-filtering the primary color video signal received;

a subtracting unit for subtracting the high-pass-filtered primary color video signals output from said high pass filter from said received primary color video signals, respectively, to thereby generate the first plurality of color signals; and an Y-matrix circuit for receiving and processing the high-pass-filtered primary color video signals output from said high pass filter to generate the first luminance signal.

6. The video signals processing apparatus according to claim 4, wherein the first plurality of color signals generated by said preprocessor includes a red signal, a green signal and a blue signal, and the plurality of color difference signals generated by said luminance/chroma processor includes a R-Y color difference signal, a G-Y color difference signal and a B-Y color difference signal, and said matrix circuit comprises:

a first switch unit for receiving the first plurality of color signals and the plurality of color difference signals, and for performing a switching operation between an output end of said preprocessor and that of said luminance/chroma processor according to said selection control signal, so as to output a received signal;

a second switch unit for receiving the first luminance signal and the second luminance signal, and for performing a switching operation between an output end of said preprocessor and that of said luminance/chroma processor according to said selection control signal, so as to output a received signal;

a minimum value detector for receiving the signals output from said first switch unit and for detecting a minimum value of values of the received signals among the plurality of color signals and the plurality of color difference signals;

a first subtracter for subtracting a minimum value from the corresponding one of the red color signal and the R-Y color difference signal output from said first switch unit;

a second subtracter for subtracting a minimum value from the corresponding one of the green color signal and G-Y color difference signal output from said first switch unit;

a third subtracter for subtracting a minimum value from the corresponding one of the blue color signal and B-Y color difference signal output from said first switch unit; and an adder for adding one of the first luminance signal and the second luminance signal output from said second switch unit to a minimum value output from said minimum value detector to generate the corresponding one of the third luminance signal and the fourth luminance signal.

\* \* \* \* \*